SWITCHED AUTOMATIC GAIN CONTROL

Filed Oct. 30, 1953 2 Sheets-Sheet 1

INVENTORS,
JACK N. BRECKMAN
& JOSEPH STRIP.
BY
Harry M. Saragovitz
ATTORNEY.

July 16, 1957 J. N. BRECKMAN ET AL 2,799,735

SWITCHED AUTOMATIC GAIN CONTROL

Filed Oct. 30, 1953 2 Sheets-Sheet 2

INVENTORS,
JACK N. BRECKMAN
& JOSEPH STRIP.
BY
Harry M. Saragovitz
ATTORNEY.

United States Patent Office 2,799,735

Patented July 16, 1957

2,799,735

SWITCHED AUTOMATIC GAIN CONTROL

Jack N. Breckman, Long Branch, and Joseph Strip, Red Bank, N. J., assignors to the United States of America as represented by the Secretary of the Army Application October 30, 1953, Serial No. 389,506

3 Claims. (Cl. 179—171)

Figure 1:
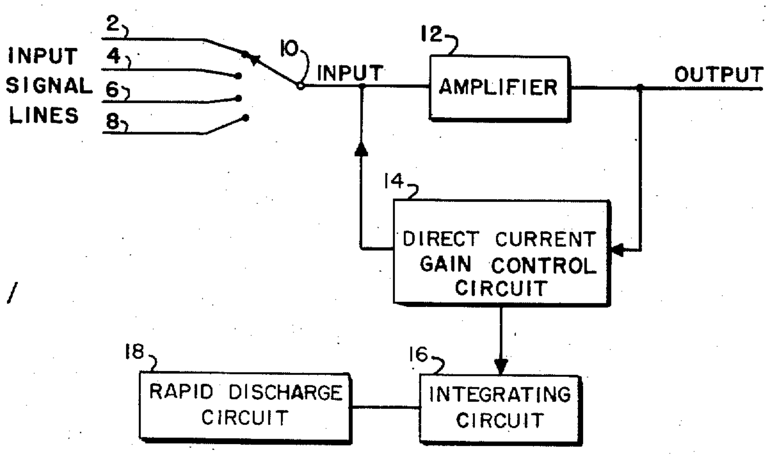

(Granted under Title 35, U. S. Code (1952), sec. 266)

The invention described herein may be manufactured and used by or for the Government for governmental purposes, without payment of any royalty thereon.

This invention relates to pulse transmission systems and more particularly to an improved automatic gain control for such pulse transmission systems.

The invention is applied to a well known field of transmission that utilizes bursts or pulses of carrier energy, which pulses are affected or modulated in one of their essential characteristics, e. g. time, width, for purposes of transmitting and receiving intelligence or data. Automatic gain control circuits of various sorts have been devised to maintain the intensity of received signal pulses at a predetermined level. The basic principle of operation is to vary the gain of an amplifier stage so as to compensate for the variations in the amplitude of input signals. Commonly, in pulse transmission automatic gain control applications, a signal-responsive, direct current voltage is coupled to a relatively long time constant gain control circuit so as to adjust and maintain the gain level during the period of the incoming signal pulses. However, to obtain a constant level of gain control, the time constant may be very long, which thus maintains the gain level beyond the duration of one signal pulse, through the interval between pulses, into the period of the next successive signal pulse and longer; consequently the adjusted gain control of one pulse adversely affects the gain control adjustment of each successive pulse. Generally speaking, gain control adjustment is fast for signals of increasing amplitude but slow for signals of decreasing amplitude.

It is an object of the present invention to provide an improved automatic gain control device adapted to more quickly eliminate fading.

It is another object of the present invention to provide a rapid adjustment to a constant output level of reception for input signals of various intensities received from a plurality of sources.

It is a further object of this invention to provide a fast acting automatic gain adjustment for each new successive signal pulse or predetermined group of pulses.

These and other objects of the invention will be more apparent from the following description and claims.

In accordance with the invention and its objects, the lagging bias voltage of the gain control in previous pulse transmission automatic gain control systems is eliminated by a rapid discharge of the gain control bias voltage. Means are included for discharging the voltage at the end of each signal pulse or group of predetermined pulses during the interval between pulses so that there is no effective gain control bias voltage remaining to affect the next successive pulse or group of pulses. There is thus provided a dual time constant for discharge of the gain control bias voltage such that there is a relatively long time constant for the duration of the signal and a very short time constant in the interval following the signal.

Figure 2:
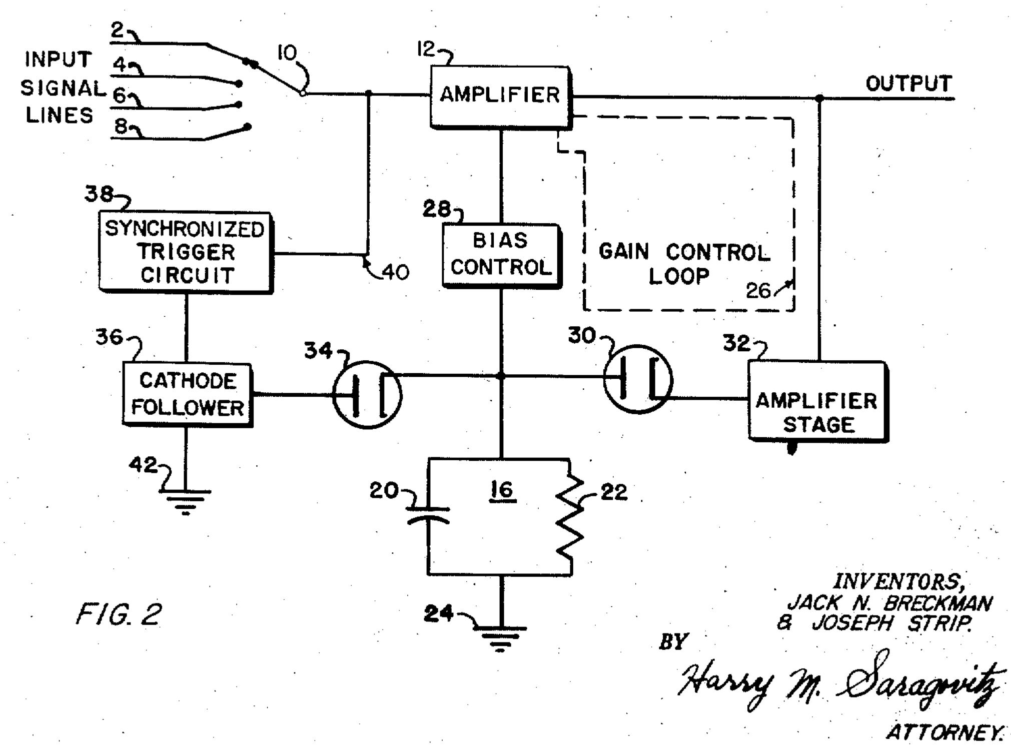

The invention will be more fully understood from the drawings in which Figure 1 is a block diagram illustrating the invention; Figure 2 is a schematic representation of the invention; and Figure 3 is a series of waveforms illustrating the operation of the invention.

In the present application the improved automatic gain control is designed to operate in conjunction with one or more stages of amplification. For the purpose of simplicity, one stage only is described, although it is to be understood that this improved automatic gain control may operate with a plurality of amplifiers by methods well known in the art.

In pulse transmission systems, the amplifier operatively associated with the automatic gain control is adapted to receive signal pulses or bursts of carrier energy which may vary over a very wide range of amplitude levels. This variation may be due to fading of signal from one source, or reception of signal of various amplitudes from discrete sources, or a combination of both. In Figures 1 and 2, the discrete sources of input signals of various amplitude levels are represented by lines 2, 4, 6 and 8. These discrete signals are applied to the input circuit of amplifier 12 through switch 10 or any other suitable switching device. It is to be understood of course that if only one signal source were available, switch 10 might be dispensed with.

Figure 3:
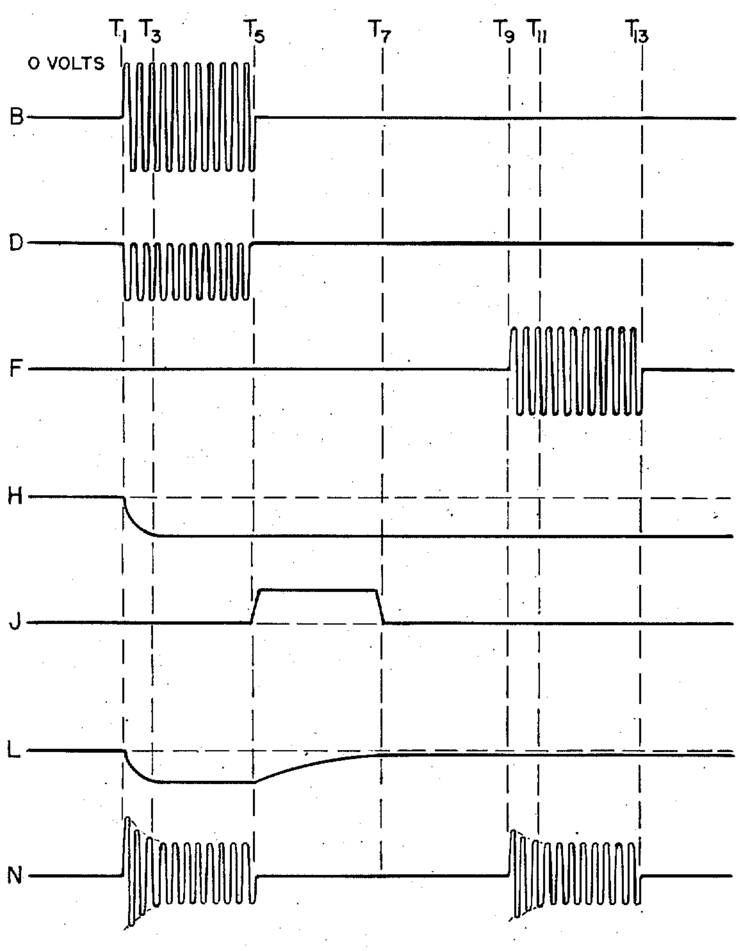

The signal from line 2 which may be one or more bursts of carrier energy, is represented by waveform B in Figure 3 having a duration represented by the time between $T_1$ and $T_5$. The selected signal from line 2 which also may be one or more bursts of carrier energy, is applied to the input circuit of amplifier 12. The output of amplifier 12 is fed to the input of gain-control circuit 14. This is the basic principle of automatic gain control and the circuitry therefor is well known in the art. In Figure 2, the circuit is shown as a loop 26 which may include, as shown, amplifier 32, a diode rectifier 30, and bias control 28 which controls the gain of amplifier 12. Such bias control means are well known in the art and need no further desciption. Although amplifier 32 is not essential to the invention, it may be of advantage in some designs to obtain an adequate amount of gain control, particularly where the current to the input 10 is taken from the output of the same stage of amplification rather than some later stage.

In accordance with the present invention there is provided in circuit with the bias control 28 an integrating circuit 16 as shown in Figures 1 and 2. Integration is obtained in Figure 2 by means of a resistance-capacitance circuit, comprising capacitance 20 and resistance 22 in parallel arrangement and connected between the plate of diode 30 and ground 24. The plate of diode 30 is connected to the cathode of diode 34 and the plate of diode 34 is connected to the output circuit of a cathode follower 36. Diode 34, cathode follower 36 and a synchronizing circuit 38 may comprise the rapid discharge circuit 18 for capacitance 20 as explained hereinbelow.

Without the rapid discharge circuit, the rectified signal output from diode 30, shown as waveform D of Figure 3, actually appears as a long integrated waveform, H, due to the charging of capacitance 20 which is affected rapidly through capacitance 20 to ground 24; this charge is maintained by the long time constant discharge path of capacitance 20 through resistance 22 to ground 24. As shown in Figure 2, bias control 28 of amplifier 12 is responsive to the charge on capacitance 20 so as to provide bias voltage proportional to the amplitude of the input signal. Thus, the holding action of capacitor 20 operates to establish in the first few cycles of signal, and maintain thereafter, a predetermined level of gain to produce a constant level of output amplitude for all input signal pulses. The initial adjustment and subsequent level of output signal are indicated for the signal pulse from line 2 by the upper and lower lines outlining the output signal pulse in waveform N of Figure 3 in the period of time $T_1$ to $T_5$.

A signal pulse or group of pulses from line 4 applied to the input of amplifier 12 through switch 10 is represented by waveform F of Figure 3. As shown, it is received at time $T_9$, having a period of transmission from $T_9$ to $T_{13}$, following an interval of no-signal from $T_5$ to $T_9$. The signal from line 4 is affected in the same manner by feedback circuit 14 and integrator 16 as is the first selected signal from line 2.

However, if the charge on capacitance 20 were not removed by time $T_9$, the slow discharge of capacitance 20 for the first signal pulse from line 2, shown in waveform H of Figure 3 beginning at time $T_3$, would continue long after time $T_9$, which is, of course, the time of occurrence of the signal selected from line 4. There thus would remain a charge from the gain adjustment of the signal pulse selected from line 2 detrimental to the establishment of proper gain level for the signal from line 4.

The rapid discharge of capacitor 20 between pulses is provided by the diode rectifier 34, the low impedance device such as cathode follower 36, and synchronizing trigger circuit 38. Diode 34 serves as a switch such that any trigger pulse of proper polarity and sufficient magnitude coupled to diode 34 will trigger diode 34 into conducting and thus discharge capacitance 20 to ground 42. Synchronization trigger circuit 38 is employed to synchronize the discharge of capacitance 20 through diode 34, the discharge being timed to follow the end of a signal pulse or predetermined group of pulses as shown in waveform I at $T_5$ in Figure 3 for the signal selected from line 2. The synchronizing trigger circuit 38 may be responsive to the signal pulses as shown by line 40 of Figure 2, or any derivative voltages thereof from any stage; or it may operate independently provided the proper synchronous timing described above is obtained. Because a rapid discharge of capacitance 20 through diode 34 is desired, a low impedance device such as cathode follower 36 of Figure 2 is coupled or connected between diode 34 and synchronization trigger circuit 38. Synchronizing trigger circuit 38 may include a one-shot multivibrator to produce an output pulse of proper shape or timing for discharge of capacitance 20. The discharge pulse, represented by waveform J of Figure 3, should have sufficient magnitude to effectively trigger diode 34 under all operating conditions of charge on capacitance 20. The duration of the discharge pulse is represented by $T_5$ and $T_7$ of waveform J and must at least equal the duration of the effective discharge of capacitance 20 as shown by $T_5$ to $T_7$ of waveform I to fully allow such effective discharge.

By this arrangement, the gain adjustment, as represented by waveform N from time $T_9$ to $T_{11}$ of Figure 3, of each successive input pulse or predetermined group of pulses, for example from line 4, is controlled only by its own level of amplitude and is without interference from the preceding signal.

While there have been described what are at present considered to be the preferred embodiments of this invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. A system for translating spaced signals, comprising a pair of independent circuits to which said signals are applied, an amplifier for said signals having its input connected to only one of said circuits, an automatic gain-control circuit for said amplifier comprising a time constant circuit connected to an output of said amplifier and including a capacitance for developing a charge, the potential of which controls the gain of said amplifier, said time constant circuit including means to charge said capacitance more rapidly than it is discharged, and means in the other of said circuits and independent of the amplitude of said signals to accelerate the discharge of said capacitance during the intervals between said signals.

2. A system as set forth in claim 1, wherein said last-named means comprises a trigger circuit responsive to the presence of each signal for generating a pulse during each interval between said signals, and means controlled by said pulse to discharge said capacitance.

3. A system for translating spaced signals, comprising an amplifier for said signals, an automatic signal-responsive, gain-control circuit for said amplifier comprising a time constant circuit including a capacitance for developing a charge, the potential of which controls the gain of said amplifier, said time constant circuit including means to normally charge said capacitance more rapidly than it is discharged, means responsive to the incidence of each signal to generate a pulse during each interval between said signals, and means controlled by said pulse to accelerate the discharge of said capacitance.

References Cited in the file of this patent

UNITED STATES PATENTS

| | | |
|---|---|---|
| 1,936,658 | Bjornson | Nov. 28, 1933 |
| 2,283,241 | Van Cott | May 19, 1942 |
| 2,451,632 | Oliver | Oct. 19, 1948 |
| 2,515,196 | Coe | July 18, 1950 |

UNITED STATES PATENT OFFICE

CERTIFICATE OF CORRECTION

Patent No. 2,799,735 July 16, 1957

Jack N. Breckman et al.

It is hereby certified that error appears in the printed specification of the above numbered patent requiring correction and that the said Letters Patent should read as corrected below.

Column 4, line 28, after "capacitance" insert -- solely --.

Signed and sealed this 19th day of November 1957.

(SEAL)
Attest:

KARL H. AXLINE
Attesting Officer

ROBERT C. WATSON
Commissioner of Patents